July 20, 1965  L. W. PARKER  3,195,224
METHOD OF MAKING INDICATING INSTRUMENTS
AND MAGNETIC STRUCTURES THEREFOR
Original Filed Nov. 19, 1959  2 Sheets-Sheet 1
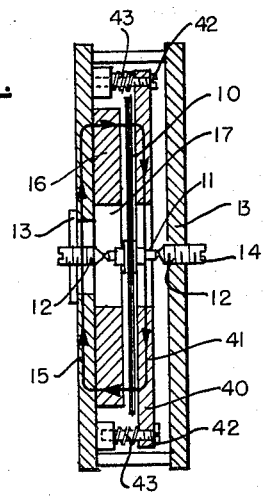
FIG. 1.
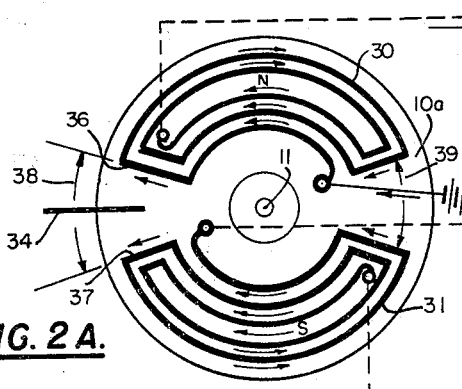
FIG. 2A.
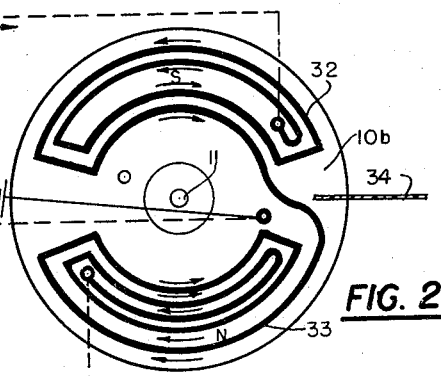
FIG. 2B.
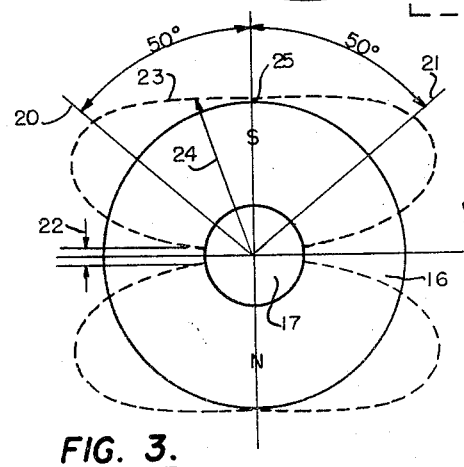
FIG. 3.
FIG. 4.
INVENTOR
LOUIS W. PARKER
BY *Hill, Pollock + Van de Sande*
ATTORNEYS

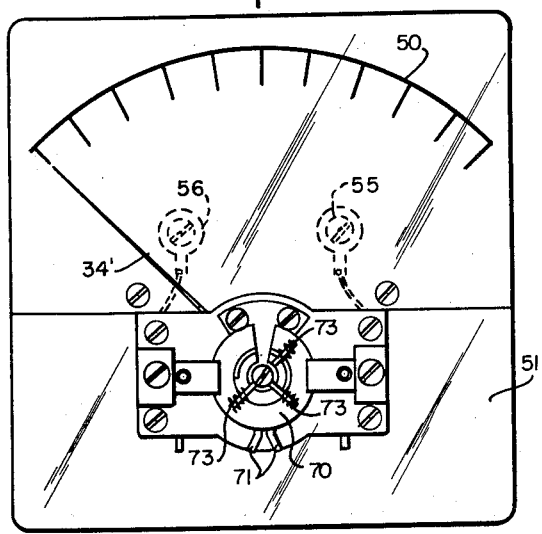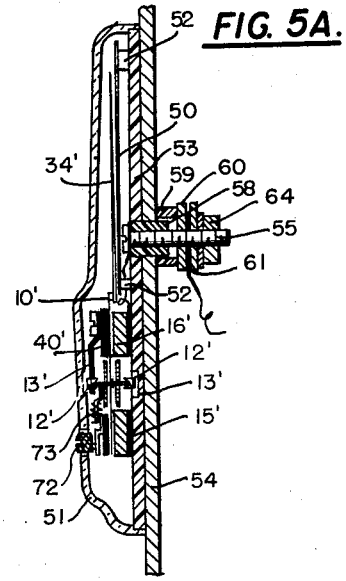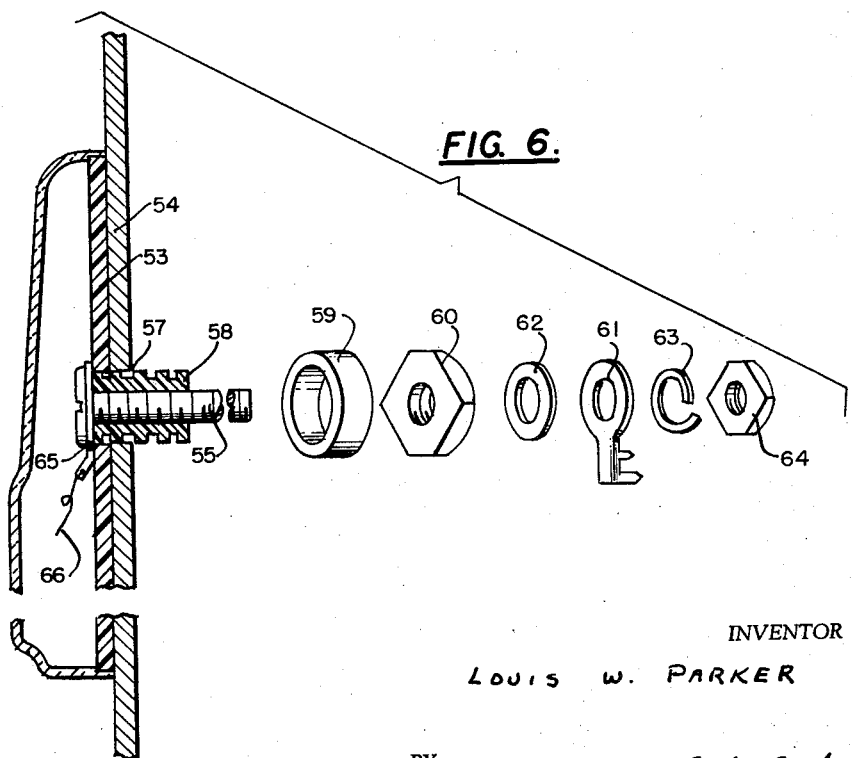

3,195,224
METHOD OF MAKING INDICATING INSTRUMENTS AND MAGNETIC STRUCTURES THEREFOR
Louis W. Parker, Beechcroft Road, Greenwich, Conn.
Original application Nov. 19, 1959, Ser. No. 854,029, now Patent No. 3,056,923, dated Oct. 2, 1962. Divided and this application Sept. 20, 1962, Ser. No. 231,607
3 Claims. (Cl. 29—155.5)

The present invention is concerned with the provision of improved electrical indicating instruments, as well as with novel magnetic structures for use in such electrical indicating instruments and methods of fabricating the same; and is more particularly concerned with a unique shape and arrangement of permanent magnet structure, and with coil devices adapted to efficiently employ non-uniform magnetic fields produced by said magnet structure, in providing for highly accurate high-sensitivity meters and indicating instruments. The instant invention comprises a divisional of my prior copending application Serial No. 854,029, filed November 19, 1959, now Patent No. 3,056,923, issued October 2, 1962, for "Indicating Instruments and Magnetic Structures Therefor," which in turn comprises a continuation-in-part of my prior copending application Serial No. 619,579, filed October 31, 1956, for "Magnetic Structure for Electrical Indicating Instruments," which is in turn a continuation-in-part of my prior application Serial No. 287,704, now U.S. Patent No. 2,773,239, issued December 4, 1956, for "Electrical Indicating Instrument."

In my prior Patent No. 2,773,239, identified above, I have described and claimed an improved meter or indicating instrument employing a rotor of printed circuit configuration. The instrument itself comprises magnetic pole pieces having said rotor mounted therebetween; and the rotor in turn takes the form of a thin disc having conductive deposits of coil configuration, supported on the opposed sides thereof. Said rotor may in fact comprise a disc of conductive material, preferably aluminum or an alloy thereof; and the coils may comprise conductive copper deposits disposed in coil configuration on opposed sides of said conductive disc and insulated from the aluminum disc by thin layers of an insulating compound preferably formed by anodizing the aluminum disc prior to the application of the coil deposits thereto. By this structure, the conductive coil deposits may perform the conventional function of providing a field in response to current passing through the coils; and this field is in turn adapted to cooperate with the aforementioned magnetic structure to effect rotation of the said rotor thereby to give an appropriate metering indication.

In accordance with the present invention, and in order to achieve a meter of much thinner cross-section than has been possible heretofore, a preferred form of magnetic structure, adapted to cooperate with a printed circuit rotor of the type described, may take the shape of a relatively thin ring having a central substantially circular hole adapted to receive the pivot or other mounting structure for the printed circuit rotor. This ring-shaped magnetic structure may in fact comprise a magnetic material having a pair of arcuately shaped magnetic pole pieces attached thereto in diametrically opposed relation; or, in the alternative, the said ring-shaped magnetic structure may comprise an originally unmagnetized magnetic material shaped in the form of a simple homogeneous magnetic ring and appropriately magnetized in a magnetizer to provide a pair of arcuate diametrically opposed poles thereon.

The magnetic materials employed in the fabrication of such a ring may be of varying types, including various metallic magnetic materials, e.g., Alnico-7A; and including, as well, various non-metallic magnetic materials. The said non-metallic magnetic materials may, in turn, comprise so-called ceramic or plastic magnetic materials such as barium oxide, one or more of the iron oxides, and oxides of manganese, barium, bismuth and related metals. A typical such material is known as "Bismanol," a name applied to a manganese-bismuth alloy described in U.S. Patent No. 2,576,679 and British Patent No. 596,966. Another material of similar properties is known as Indox, which is a ferrite in the form of $BaFe_{12}O_{19}$. Still other materials performing in similar manners and having analogous electrical and magnetic characteristics, are known; and for purposes of simplification, magnets of these well known materials will be termed "ceramic magnets" hereinafter.

In order to fully appreciate some of the advantages achieved by the forms and arrangements of magnetic materials employed in the present invention, it might first be noted that it is well known for the calibration of D.C. electrical instruments to change with the passage of time, due to the fact that the permanent magnet in them loses some of its magnetism. Various kinds of materials have been tried for such permanent magnet structures, but the more efficient the magnet, the faster its power seems to drop with time. A small amount of drop, such as one or two percent, can make the instrument unreliable for some purposes; and most efficient magnets tend to lose this much or more in a period of less than two years. Accordingly, when the instruments are built into some equipment, there is no easy way to ascertain whether the calibration has remained correct; and it is usually assumed, incorrectly, that low readings are due to other causes in the equipment since the meter is often relied upon as a standard.

The demagnetization of known magnets may result from mere aging, as well as from vibration or heat. Ceramic magnetic materials, however, are largely unaffected by such factors. In addition, such ceramic magnetic materials exhibit high coercive forces which can be as much as ten times that of good conventional permanent magnetic alloys. Accordingly, such ceramic magnetic materials represent preferred materials for use in the present invention although, as will appear subsequently, metallic and alloy magnetic materials may also be used.

Ceramic magnets have in fact been known for some fifty years; but for the most part were considered impractical heretofore for use in electrical indicating instruments. This rejection of ceramic magnetic materials in indicating instruments has been due primarily to certain magnetic properties thereof which were previously considered undesirable. One such property is that the permeability of the material itself is nearly unity. In other words, it is about as good a conductor of magnetic lines of force as a vacuum would be, and it is not possible to increase the field density in an air gap by making the magnet longer. One using such a magnetic material must accordingly depend upon and employ the small magnetic domains near said air gap. Lengthening of ceramic magnets in fact removes necessary magnetic domains further from the air gap, making them even less effective. By way of example, an increase of length over one quarter of an inch in a ceramic magnetic material is of little value, while an increase in length over about one inch yields no practical effect whatsoever. For effective use, therefore, ceramic magnets employed in the meter movements of the present invention should have a total length in the order of one quarter of an inch or less.

Another undesirable property of ceramic magnetic materials is that their field density is actually much less than that of good grade conventional metallic magnetic materials. This decreased field density may be only one fifth of that available from other metallic magnetic materials; and for this reason it is necessary to increase the cross-section of the magnet structure appreciably.

By reason of the foregoing factors, I have found that ceramic magnetic materials, and the desirable properties thereof, may be employed in meter movements provided particular shapes and arrangements of such materials are utilized. The best shape for the magnetic structure has in fact been found to comprise a flat relatively thin plate or ring of the type described previously, having a pole formed on each of the two large areas thereof and backed up by a plate of high permeability material. This uniquely shaped magnet, in addition to effecting the magnetic and operational advantages to be discussed hereinafter, achieves a most important commercial advantage in that it lends itself to the production of a very thin meter, adapted to be mounted directly on the outside of an instrument panel rather than projecting therethrough, and adapted to be mounted more simply than has been possible heretofore.

From a magnetic point of view, the uniquely shaped magnet of the present invention is further desirable since the high coercive force of ceramic magnets results from the large crystal anisotrophy of the ceramic material. It is therefore best to magnetize such ceramic magnetic materials in the direction of pressing which was applied at the time the magnet was molded, namely in the direction of the smallest dimension. No milliammeter designed in conventional fashion can make efficient use of such an odd shaped magnet.

It is accordingly the main purpose of this invention to create a new form of instrument, much thinner and more easily mounted than has been possible heretofore; which will operate as well as or better than conventional forms despite the use of a magnet having an entirely new shape, pole configuration, and flux distribution.

As mentioned above, the flat substantially ring-shaped or annular magnetic wafer, comprising the magnetic structure of the present invention, is of unusually large surface area and small thickness, and has a pair of large substantially diametrically opposed poles thereon. Such large poles nessitate a large substantially flat rotor to make the best use of most of the magnetic lines of force, thereby rendering conventional types of moving coils nearly useless. I have found that I can increase the magnetic field if I locate magnetic domains in approximately equal amounts on both sides of the rotor; i.e. ring-shaped magnets can, in accordance with the present invention, be located on both sides of the flat rotor. This puts twice as many magnetic domains in proximity to the rotor, thereby resulting in a magnetic field density greater than that available from conventional magnets of equal mass. However, this double magnet increases the cost of manufacture. Therefore, in most cases I prefer to use one magnet on one side of the disc, and a ferrous metal element on the other side to complete the magnetic circuit. The magnetic poles defined on the ring-shaped magnet are interconnected to one another by a plate of magnetic material comprising a high permeability magnetic bridge; and the magnet is cemented or otherwise secured to this plate.

It will be appreciated from the foregoing discussion that the shape of magnetic structure contemplated by the present invention takes the form of a ring-shaped magnet defining large flat faces having arcuate diametrically opposed magnetic poles mounted or magnetized thereon; and the aforementioned printed circuit rotor is adapted to be mounted so that its surface is disposed substantially parallel to one of the flat faces of the said ring-shaped magnet, with the mounting structure for the disc or rotor passing through a central opening in the ring-shaped magnet. The provision of such a central opening in a ring-shaped flat surfaced magnet results in another significant problem. In particular, it has been found that a magnet of the shape described, having a pair of diametrically opposed arcuate poles thereon, produces a non-uniform flux field characterized by plural points of peak flux intensity spaced about the circumference of the ring-shaped magnet. This non-uniform flux field has in fact been found to be present in the unique ring-shaped magnet of the present invention, having a central opening, regardless of whether metallic or ceramic magnetic materials are employed.

The occurrence of a non-uniform flux field of the type described would, under ordinary circumstances, cause a non-linear deflection of the rotor upon application of current thereto, since movement of the rotor will cause different portions thereof to encounter fields of different strength. The present invention, however, is adapted to utilize efficiently such a non-uniform flux field produced by ceramic or metallic magnets arranged in the flat ring-shaped configuration described, by so positioning the several coils on the printed circuit rotor that different portions of the coils move through regions of increasing as well as decreasing field strengths, thereby to effect a torque compensation resulting in fairly linear movement of the rotor, notwithstanding the fact that the rotor is moving through a non-uniform flux field.

It has been further found that even with the type of torque compensation mentioned, there tends to be some crowding of the meter scale at the higher end of the rotor movement; and the present invention increases linearity of movement over that described in my prior copending application Serial No. 619,579, identified previously, by effecting an appropriate shift in the magnetic field relative to certain portions of the rotor coils, as will be described hereinafter.

It is accordingly an object of the present invention to provide improved magnetic structures for use in electrical indicating instruments.

Another object of the present invention resides in the provision of a new electrical indicating instrument, employing a thin magnetic structure, and having an overall thickness substantially less than has been possible heretofore.

A further object of the present invention resides in the provision of permanent magnets of various ceramic magnetic materials, as well as of various other magnetic materials, including metals and alloys thereof, disposed in a novel configuration, for use in improved electrical indicating instruments.

Still another object of the present invention resides in the provision of an electrical indicating system comprising magnet means producing a non-uniform magnetic field, cooperating with a rotor so arranged with respect to said non-uniform field as to provide substantially linear movement of said rotor.

A further object of the present invention resides in the provision of a magnet, for an indicating instrument, having a novel flux distribution curve, as well as in a method of magnetizing such a magnet, and assembling the instrument, to stabilize the shape of its said flux distribution curve.

Still another object of the present invention resides in the provision of electrical indicating instruments adapted to utilize effectively a non-uniform magnetic field.

A still further object of the present invention resides in the provision of a new magnet and rotor arrangement, for use in electrical indicating instruments, having an unusually small dimension in depth enabling the instrument to be mounted on the surface of an instrument panel or the like, without projecting through said panel.

A further object is to provide a magnet structure having a high permeability metal plate placed adjacent the back of the instrument in such manner that mounting of the instrument on a steel panel does not disturb the operating magnetic field, thereby to make recalibration of the instrument unnecessary when used in close proximity to such a panel.

A still further object of the present invention resides in the provision of an improved meter movement comprising a magnet structure and rotor so arranged with respect to one another as to distribute substantially equally the crowding at both ends of the scale of rotor deflection.

In providing for the foregoing objects and advantages, the present invention contemplates the provision of a magnetic structure of substantially flat ring-shape, disposed adjacent and substantially parallel to a disc-shaped printed circuit rotor generally of the type described in my prior Patent No. 2,773,239. The said flat ring-shaped magnet structure may comprise ceramic or metallic magnetic materials, and defines a pair of permanent magnetic poles of arcuate shape diametrically opposed thereon. These poles, which may comprise arcuate pole pieces separately affixed to a magnetic plate, or which may, in the alternative, comprise large arcuately shaped magnetized areas on a homogeneous magnetic ring, have relatively large flat surfaces disposed parallel to the plane of the aforementioned substantially flat rotor; and the said ring-shaped magnet structure further defines a central preferably circular hole through which a mounting structure adapted to carry the aforementioned printed circuit rotor may pass. By reason of the flat circular shape of the magnetic structure, and particularly by reason of the circular hole centrally disposed therein, the ring-shaped magnet structure is found to produce a non-uniform flux field characterized by plural points of peak intensity spaced from one another about the outer circumference of the ring-shaped magnet. In order to utilize this non-uniform flux field efficiently, particular shapes and dispositions of conductive wiring, comprising the conductive coil deposits on the aforementioned printed circuit rotor, are employed.

In particular, the printed circuit on the rotor, comprising the aforementioned coils, takes the configuration of a plurality of substantially flat coils whose outline shapes are each substantially arcuate annular segments, with each said segment covering an arc less than 180°. The several annular segmental coils have ends disposed in spaced angularly inclined relation to one another, and the angular space between a pair of adjacent or facing ends, of two adjacent coils, is preferably no greater than 40°. The angular space between said pair of adjacent or facing ends of the printed circuit coils is preferably related to the space defined between facing ends of the aforementioned magnetic poles on the ring-shaped structure, the relationship being such that the smallest spacing between the adjacent facing ends of the said arcuate poles is substantially one-half the largest spacing between a pair of adjacent ends of the two printed circuit coils. In must be remembered, however, that when poles are magnetized onto a homogeneous ring, the edges of these poles are not sharply defined; and consequently the above provision regarding the pole spacing is actually a rather loose generalization.

In addition, the aforementioned printed circuit coils are so positioned relative to the points of peak intensity in the non-uniform flux field mentioned previously, that one end of one of said coils is positioned substantially adjacent or slightly displaced from a point of peak flux intensity, while one end of another said coil is displaced from a point of peak flux intensity on the other side of the same peak when the rotor is in a predetermined zero or rest position. By so displacing facing ends of two rotor coils on opposite sides of a point of peak flux intensity, rotation of the rotor causes one of the coils to move into a region of decreasing field strength, while the other said coil moves simultaneously into a region of increasing field strength when current is passed through the coils to effect rotor movement; and the decrease in rotor torque produced by movement of one coil into a region of decreasing field intensity is in large part balanced by an increase in rotor torque produced by movement of the adjacent coil into a region of increasing flux intensity, thereby to maintain a fairly uniform torque on the rotor over the major portion of its rotation.

It has been found that the compensation of decreasing and increasing rotor torque mentioned above is in fact applicable over the major portion of the rotor movement, and loss of linearity at the ends of the full range of motion is only moderate. As a practical matter, however, it has been further found that notwithstanding the existence of peak magnetic fields near both ends of the range of rotor movement, the sensitivity suffers near these ends, since one of the coils is nearly outside the field near said ends. As a result, some crowding of the scale tends to occur, mostly near the full deflection end. This crowding is, in accordance with a further aspect of the present invention, reduced in substantial degree by so arranging the magnetic structure and rotor coil that tendencies for the scale to crowd near one scale end are in fact distributed between both scale ends.

The foregoing objects, advantages, construction and operation of the present invention will become more readily apparent from the following description and accompanying drawings, in which:

FIGURE 1 is an elevation in section illustrating a portion of one form of metering or indicating device embodying the invention.

FIGURES 2A and 2B illustrate the conductors on both sides of a rotor disc of the type employed in the instrument of the present invention.

FIGURE 3 is a side elevation of the magnetic structure employed in the present invention, showing the non-uniform flux field produced thereby.

FIGURE 4 illustrates the arrangement of FIGURE 3, with the non-uniform flux field shifted to effect a distribution of scale crowding between the ends of the meter scale.

FIGURE 5 is a front view of a complete instrument embodying the present invention.

FIGURE 5A is a side section of said instrument, taken on line 5A—5A of FIGURE 5; and FIGURE 6 is an exploded representation of the improved mounting means which may be employed with the instrument comprising the present invention.

Referring now to FIGURE 1, it will be seen that a meter movement constructed in accordance with the present invention preferably comprises a disc 10 of substantially circular configuration provided with a centrally disposed shaft 11 having friction reducing points at each end which are journalled in set screws 12; and the said set screws 12 are in turn adjustably mounted in central bearing plates 13. Set screws 12 are provided with a suitable kerf 14 for bearing adjustment, and may be provided with locknuts if desired, so as to maintain the adjustment once it is made. An end plate 15, comprising a high permeability magnetic material, is provided for supporting thereon a ring-shaped magnet 16 of the type contemplated by the present invention; and both end plate 15 and ring-shaped magnet 16 are provided with central openings, as illustrated, to receive one of the set screws 12 as well as a portion of the rotor shaft 11.

As a practical matter, it will be noted that two ring-shaped magnets such as 16 may be provided on opposite sides of the rotor disc 10 respectively, with these ring-shaped magnets being mounted, if desired, on high permeability plates such as 15, disposed substantially parallel to one another on opposite sides of rotor disc 10. In the alternative, and in order to produce a more economical structure, a magnet such as 16 need be provided on only one side of disc 10, and a plate of magnetic material may be provided on the other side of said disc to complete the magnetic path. This latter arrangement is shown in FIGURE 1. In particular, a plate 40 is provided on the side of disc 10 which is not covered by the magnet poles of magnet 16. The purpose of this plate 40 is to conduct the magnetic lines of force 41 between the two magnetic poles on magnet 16. Consequently, plate 40 is made of a high permeability material such as steel. Plate 40 may be adjustably mounted on screws 42 and tension springs 43 so that the air gap adjacent disc 10 may be varied. In this way a slight variation of the magnetic field may be accomplished, in order to take care of production variations, both in magnets and springs. However, the variable gap is optional, as production variations can be taken care of by other means. It should further be noted that, in FIGURE 1, the hair springs used to conduct current to disc 10 and to positionally bias said disc, and all other parts not serving to illustrate the fundamental principles of operation, have been omitted for the sake of simplicity.

The actual shape of magnet 16 is best illustrated in FIGURES 3 and 4. In particular, it will be noted that the magnet structure is of circular shape and defines a central opening 17 for purposes already described. The ring-shaped magnet 16 may comprise a ceramic magnetic material of the type described previously, in which event it may have a thickness in the order of one-tenth inch in a direction along the direction of shaft 11. In the alternative, the ring-shaped magnet 16 may comprise a metallic magnetic material such as Alnico-7A, or other permanent magnetic material; and when a magnetic material such as Alnico-7A is employed, the thickness of the magnetic structure should be increased somewhat, e.g. from one-tenth inch to a thickness of two-tenths inch, in the case of Alnico-7A. These figures, of course, may vary within wide limits, depending mainly on the sensitivity and design of the instrument.

It will moreover be noted that the ring-shaped structure 16 has a substantially flat annular surface extending substantially parallel to the plane of disk 10; has a limited thickness transverse to said flat annular surface, and has a central opening such as 17 through which the elements 11–12 may pass. Magnetic structures of this general shape, whether they comprise a single annulus, or a plurality of arcuate elements combined to form a similar such annulus, will be termed a "ring-shaped" magnet hereinafter. The magnetic structure 16 may have arcuate pole pieces placed thereon; or, in the alternative, may comprise a homogeneous magnetic ring which is suitably magnetized to provide a pair of substantially annular segmentally shaped poles arcuately disposed thereon. These poles have been generally illustrated in FIGURE 3 by the designations S and N; and it will be noted that each of these magnetic poles is of annular segmental shape, with the two poles being diametrically opposed from one another and having facing ends which are actually magnetically spaced from one another, substantially as at 22.

This provision of annular segmentally shaped poles on a relatively thin flat-surface ring-shaped magnetic structure having a central opening, causes a non-uniform magnetic field to be produced, regardless of whether the magnetic material employed is a ceramic magnetic material or a metallic magnetic material; and the distortion in the field is believed to occur primarily because of the central hole 17 and arcuately disposed opposite polarity poles. The non-uniform flux field is, in particular, characterized by a plurality of points of peak flux intensity, and two of these points associated with the S pole have been designated in FIGURE 3 as points 20 and 21, it being noted that there are two such points of peak flux intensity also associated with the opposite or N pole.

The relative magnitudes of the field at various points over the pole surfaces of magnet 16 have been depicted by dotted curve 23 which represents the successive positions of a coordinate 24; and the shape of curve 23, as depicted in FIGURE 3, is in fact an accurate representation of the field produced in a practical embodiment of the present invention. The revolution of coordinate 24 to successive points along dotted curve 23 can be utilized to determine the relative field density of the magnet at all angles, in said practical embodiment, by appropriately noting the length and angular position of the said coordinate 24. Inasmuch as only the component of magnetic lines of force which is perpendicular to the surface of the magnet poles is instrumental in exerting a turning moment, dotted line 23 indicates only this active component. It will be noted that each of the poles, in addition to including the points of peak intensity 20 and 21, includes a point of decreased intensity in the region 25; and in addition, the poles describe regions of very small flux intensities adjacent their facing ends in the magnetic spacing region previously designated 22.

It is very important, in mass production, that the shape of curve 23 be substantially the same in many thousands of magnets. Any compensation for production variations which can be effected by increasing the air gap or shunting the instrument, will affect the general sensitivity of deflection; but a change in the shape of curve 23 would affect the linearity of deflection. Inasmuch as the meter scale (see e.g. FIGURE 5) is printed the same for all instruments, a change in the shape of curve 23 would result in inaccurate readings that could not be corrected by conventional means.

I have found that by using an extremely strong magnetizing force (20,000 oersteds or more) it is possible to turn, in the desired direction, practically all magnetic domains in ceramic or Alnico magnets. After this, I reduce the field evenly by removing the armature which closes the magnetic circuit. This operation only changes the amplitude but not the shape of curve 23. All magnets so treated have substantially the same curve shape and are not affected by small demagnetizing forces.

In short, a substantially constant flux distribution curve of the type illustrated, is achieved in accordance with the present invention by overmagnetizing the magnet at a time when the magnet is not yet assembled into the meter; and the magnet is then removed from the magnetizer without its "keeper" (or return path plate) to permit some demagnetization of said magnet thereby to stabilize the field. This procedure is quite different from orthodox methods used heretobefore, wherein the magnet is normally magnetized only after the meter is fully assembled, and the magnet is then never removed from the assembly.

It will be appreciated that the non-uniform flux field illustrated for example in FIGURE 3 would, under ordinary circumstances, be of considerable disadvantage in the provision of an accurate indicating instrument. In particular, if there were but a single radial conductor on a rotor positioned in the non-uniform flux field illustrated, the torque of such a rotor would vary over the range between points 20 and 21 (assuming that these represent the limits of desired rotation), in proportion to the length of coordinate 24 between these limits. The non-uniformity, however, can be employed effectively in conjunction with a rotor (e.g. a rotor of the type designated 10 previously), by utilizing a large number of radial conductors on such a rotor distributed over a comparatively wide angle, and appropriately positioned in the non-uniform flux field. These considerations will become more readily apparent from an examination of FIGURE 2.

FIGURES 2A and 2B illustrate the opposite sides 10a and 10b of the rotor 10 shown in FIGURE 1; and the said rotor 10 is of the type already described in my prior U.S. Patent No. 2,773,239. The rotor 10 may be formed of an aluminum alloy, and the exterior surfaces 10a and 10b of the said rotor may be initially anodized to provide a thin coating of aluminum oxide, acting as an insulating layer upon which may be carried printed circuit coils of the configuration illustrated. These printed circuit coils have been designated as coils 30, 31 on one side of the disc, and 32, 33 on the other side of the disc; and the coils on opposite sides of the disc are interconnected, as shown in FIGURE 2, and as described in my prior Patent No. 2,773,239, whereby current may be caused to pass in sequence through the several coils 30 through 33 inclusive to effect rotation of the disc 10 about its central portion or shaft 11; the amount of rotation being appropriately indicated by a pointer 34 carried by the disc and cooperating with a scale 50, to be described (see FIGURES 5 and 5A).

The several coil sections 30 through 33 inclusive are each substantially flat coils whose outline shapes are substantially arcuate annular segments; and it will be noted from FIGURE 2 that each segment covers an arc less than 180°. The adjacent ends, for example 36, 37 of adjacent ones of the coils on each side of disk 10, are spaced and angularly disposed relative to one another; and the actual angle 38 between these facing ends is preselected to be within the range 10° to 40°. Moreover, the spacing between these facing ends 36, 37 is preferably so chosen that the magnetic spacing between the poles S and N on the magnet structure 16 is approximately one-half the largest spacing between a pair of adjacent ends such as 36, 37 on rotor 10. It will further be appreciated that while the foregoing discussion has been concerned with the angular space 38 between one pair of facing ends 36, 37 of coil sections 30 and 31, a generally similar discussion applies to the angular space such as 39 between the other pair of facing ends for this same pair of coil sections, as well as to the pairs of facing ends on the opposite sides of the disk and associated with coil sections 32, 33.

A disk of the type and arrangement described in reference to FIGURE 2, can be employed with a ring-shaped magnet of the type described in reference to FIGURE 3; and if proper attention is given to the relative positioning of the several coil sections and magnet, a fairly uniform torque can be effected on the disk or rotor 10 during rotation thereof, notwithstanding the non-uniform flux field produced by the ring-shaped magnet 16.

In particular, disk 36 is preferably associated with hair springs and adjustment means (not shown) adapted to positionally bias the disk, at a zero position, so that various portions of the coil sections on the disk are particularly located with regard to different parts of the non-uniform flux field 23 produced by magnet 16. It must be remembered that the only parts of the coil creating a torque are the radial portions. In one possible positioning, the coil end 36 (which extends substantially radially) can be initially disposed adjacent a point of peak flux intensity such as 20 in which event, due to the angular gap 38, the facing end 37 of coil 31 will be appreciably displaced from this peak of flux intensity 20. Upon subsequent rotation of the disk 10, due to current flow through the several coil sections, the end 36 of coil 30 will move away from peak 20 toward point 25, and the coil 30 will in turn be moved through a region of successively decreasing field strength. At the same time, end 37 of coil 31 will move toward peak 20, and coil 31 will thereby move into a region of increasing flux strength. By proper choice of values, especially the angular gap between coils, the decrease in torque due to the movement of coil 30 into a region of decreasing flux strength, may in fact be nearly compensated by the increase in torque on rotor 10 produced by movement of coil 31 into a region of increasing flux strength; and the combined effect will be to maintain a fairly uniform torque on the rotor notwithstanding the non-uniform flux field produced by magnet 16.

The compensation described is such that the loss of linearity at the end of the full range of motion is only moderate. Moreover, the compensating effect takes place near both the peak 21, i.e. near the full deflection end of the range of motion, and at the peak 20, i.e. near the zero end of the range. However, in spite of the peak magnetic field which appears near both ends 20 and 21 of the range of deflection, the sensitivity of the instrument suffers somewhat near these ends; and the reason for this is that near the ends of the range one of the coils is nearly outside of the magnetic field. Over the middle of the deflection range, i.e. near and to the sides of point 25, the magnetic field varies only slightly, and both coils are effective in producing a torque.

The range of substantially linear motion for an arrangement of the type described, may vary between approximately 100° and 120°, depending upon the choice of parameters in the device. When the angular gap between the facing coil ends, e.g. gap 38, is approximately 35°, the linearity of movement is good, but the range of linear deflection is only about 100°. As the gap between facing ends of the coils is decreased and the gap between the magnetic poles is simultaneously decreased, the permissive angle or range of rotor deflection increases, but the scale may deviate somewhat more from linearity. These considerations have been illustrated on FIGURES 3 and 4 by depicting an approximate range of deflection of 50° between each of the end points 20 and 21 (representing, respectively, zero and full deflection positions) and the midpoint 25, thereby indicating a range in the order of 100° for full linear deflection between the peak points 20 and 21.

It will be appreciated, of course, that the discussion given above has been concerned with but a single pole S, and the operation of the coils relative to this single pole. As a practical matter, however, the structure of magnetic pole, field distribution, and coils, is duplicated for both the north and south poles. Accordingly, the torque created by both halves of the rotor is added, and any non-linearity produced during rotation of the lower half of the meter structure is added to the non-linearity produced by the other half of the structure. The total non-linearity may be decreased somewhat, however, by displacing the coils slightly in such manner that the angular gap 38 between the facing ends 36 and 37 of the coils 30, 31 is somewhat larger than the angular gap 39 between the other facing ends of the same coils; and by such an arrangement, it is possible to displace the two non-linear regions or peaks so as to reduce the resultant non-linearity. The extent of displacement is in the order of five degrees, i.e. the gap 38 may be five degrees wider than gap 39.

Another way to achieve good linearity with a wide deflection angle is to use coils wherein the gaps 38 and 39 are nearly zero; and the air gaps between the magnet structure and rotor can also be varied so that the gap is slightly greater in the region of a peak such as 20 and 21 than it is in the region of a valley such as 25. By this method peaks 20 and 21 may be reduced to the same value as valley 25, creating a uniform field. Either arrangement can be employed, although it may be more costly to eliminate the peaks on the magnetic field due to the greater accuracy required.

While the arrangements described above give fairly good linearity of movement over a fairly wide angle, it has been found that some crowding of the scale nevertheless occurs near the ends thereof. The crowding is in fact greater near the full deflection end (e.g. near peak 21) than it is near the zero end of the instrument (e.g. near peak 20) despite the fact that the field distribution is actually symmetrical to the center line of the instrument. To understand the reason for this, let us assume for simplicity, that the only variable over the range of deflection is the magnetic field; and let us further assume that this magnetic field is weaker near the extreme ends of the range, causing in this way a decreased sensitivity near these ends. The drop in sensitivity may be assumed as a percentage of any given deflection (i.e. a drop of 5% in field density would, under the assumptions specified, result in a drop of 5% in the deflection angle). Near the zero end where the deflection is small, a 5% variation in deflection means fewer milliamperes than at the full deflection end of the instrument. If each milliampere is assigned a given increment or angle of deflection, the reduction in the size of these angles near the full deflection end will be more than at the low deflection end, i.e. the full deflection end of the scale tends to be more crowded than the low deflection end.

It is generally undesirable to have more crowding on one end of the scale than on the other. This disparity in crowding may, in the arrangements described, be considerably reduced by distributing the tendency to crowd between the two ends of the deflection range. This may be done by removing a portion from the full deflection end of the scale and adding a same amount to the beginning of the scale. In practice, however, this can be best accomplished simply by rotating the magnetic poles over a given angle in the direction of the full scale deflection. Such an arrangement is illustrated in FIGURE 4.

In particular, it will be noted that the magnet 16' shown in FIGURE 4 is identical to and produces the same non-uniform field distribution as that previously described in reference to FIGURE 3, with the exception that the peaks of the field are shifted through an angle away from the zero position 20' of the scale and toward the full deflection position 21' of the scale. It has been found, in one unit, that best results were obtained when the poles were rotated toward the full deflection end of the scale through an angle of substantially 11.5°. However, this angle will vary somewhat depending upon the physical parameters of the instrument. In any case, however, some relatively small angle of rotation can be effected, and this angle has been depicted in FIGURE 4 as the angle α.

It will be appreciated, of course, that an actual physical rotation of the magnet structure can be employed to effect the pole shifting described. However, where the magnet structure is a simple homogeneous ring initially unmagnetized, all one has to do to effect the pole shifting is to place the magnetic ring in the magnetizer at the desired angle, and in this way directly form poles shifted through the desired angle. It will also be appreciated, of course, that the various considerations described above with regard to pole shifting apply in a "non-zero center" reading instrument, i.e. one in which a pointer such as 34 is, at the zero position of the instrument, substantially displaced from the point 25 of FIGURE 3. In a zero center instrument, no angular displacement of the poles need be employed.

As has already been mentioned, the thin substantially flat magnetic structure of the present invention, cooperating with the flat rotor employed therewith, permits the overall meter movement to be considerably thinner than has been possible heretofore; and this in turn permits the production of a meter having appreciable commercial advantages. Meters employed heretofore conventionally utilize horseshoe-shaped magnets, and the meter movement itself is therefore normally of substantial depth. As a result, meters adapted for use on instrument panels must normally be recessed into such panels; and the panel itself must normally be cut with a fairly large aperture adapted to receive the meter movement. This type of installation, and the undesirable features of large thickness meters, can be completely avoided by the present invention.

An actual meter arrangement constructed in accordance with the present invention is shown in FIGURES 5 and 5A. The meter movement itself is depicted in cross-section in the lower portion of FIGURE 5A; and it will be noted that this meter movement comprises in essence the various parts and the arrangement thereof already described in reference to FIGURE 1, with the exception that the adjustable air gap feature of FIGURE 1 is not included in the arrangements of FIGURES 5 and 5A. Other parts already described in reference to FIGURE 1 have been identified in FIGURE 5A by like numerals having primed designations, i.e. the rotor is depicted as 10', etc. The instrument shown in FIGURES 5 and 5A includes, in addition, a rotatable zero adjustment plate 70 having downwardly extending projections 71 cooperating with a zero adjust screw 72. Pointer 34' is counterbalanced, on rotor disk 10', by balancing elements 73.

It will be noted that the overall meter is very thin in cross-section, and the meter itself may be encased within a transparent envelope 51, e.g. of plastic material. Envelope 51 may in fact comprise front and rear plastic sections snap-engaging one another whereby said envelope may be opened to gain access to the interior structure.

Envelope 51 contains therein the meter movement already described, as well as a meter scale 50 mounted upon appropriate supporting elements 52. The base plate 15' to which the magnet 16' is cemented is composed of high permeability metal, and this plate serves to shield the instrument from disturbing magnetic fields. The back 53 of the meter case 51, being made of low or unity permeability material such as plastic, further serves to isolate the magnetic system. As a result, the instrument itself may be directly mounted upon a panel 54, on the exterior of said panel; and the panel 54 can in fact be of steel construction inasmuch as the high permeability plate 15' and the back 53 of the meter case causes the instrument to be unaffected by proximity thereof to ferrous metals, and in particular prevents panel 54 from exhibiting a disturbing influence on the meter movement.

It should further be noted that the flat relatively thin meter of FIGURES 5 and 5A may be mounted on panel 54 without the need of providing the one large and three small holes normally utilized in meter mountings. The mounting of the improved meter shown in FIGURES 5 and 5A is in fact accomplished by only two bolts (or screws); and these bolts act not only to mount the meter on the panel exterior, but also act as terminals for the meter. The positions of the two bolts are depicted in FIGURE 5 at 55 and 56; and the actual configuration of one of the bolts 55 is shown in FIGURE 5A and in exploded representation in FIGURE 6.

Referring to these latter two figures, it will be noted that panel 54 can be provided with a pair of relatively small holes designated as 57 adapted to receive a sleeve 58 of insulating material extending from back plate 53 of the meter, there being two such holes such as 57 and two such sleeves such as 58 for the two bolts 55 and 56. Sleeves 58 may preferably be made integral with back plate 53 and threaded on the inside to receive bolts 55 and 56. Bolts 55 and 56 extend from a position to the rear of scale 50 through sleeves 58 and thereby through panel 54 to the rear thereof. An annular insulator 59 abuts on the rear surface of panel 54 and is held in place by a nut 60. An electrical contact 61 may then be placed on bolt 55 and held in place with washers 62 and 63 by a further nut 64. A further contact 65 may be provided on the interior of the instrument connected to a lead such as 66 for providing electrical continuity between bolt 55 and a hair-spring feeding one of the terminals on rotor disk 10'; and it will be appreciated that a similar such lead is provided between bolt 56 and a hair-spring associated with the other contact on rotor disk 10'.

The two bolts 55 and 56 thus serve not only to mount the instrument directly on the instrument panel, but also serve to provide electrical connections to the interior of the instrument. The arrangement of parts is such that the instrument may be mounted on panels such as 54 having various thicknesses, i.e. zero to one-fourth inch, without requiring any change in the mounting structure. Moreover, it is preferable that the spacing between bolts 55 and 56 be standardized at, for example, one and one-half inches, for all instruments, whether large or small; and by this arrangement, therefore, once holes such as 57 have been drilled into an instrument panel, various sizes of instruments can be mounted and/or interchanged in the same mounting or terminal holes without requiring any further changes to the panel. Furthermore, it should be noted that the instrument can be used at relatively high voltages, i.e. 5,000 volts, inasmuch as the insulation provided between the mounting and electrical connecting bolt, such as 55, and the panel, such as 54, can be made relatively long, i.e. one-fourth inch, and its surface ribbed to provide a longer leakage path.

By far the greatest commercial advantage of the instrument, however, is that, due to its very small thickness, the meter can be mounted directly on the outside of an instrument panel instead of projecting therethrough as is done conventionally, thereby saving space on the interior of and to the rear of the panel; and in addition, the mounting is effected by only two screws, bolts, or terminals which serve as electrical connections as well, thereby making meter installation and replacement or changing of meters a very simple procedure.

While I have thus described preferred embodiments of the present invention, many variations will be apparent to those skilled in the art. All such variations and modifications as fall within the spirit of the invention, are intended to be covered by the claims appended hereto.

Having thus described my invention, I claim:

1. The method of fabricating an electrical meter of the type having a rotor mounted for movement adjacent a stationary cooperating permanent magnet structure, comprising the step of magnetizing a relatively thin, flat surfaced, ring-shaped element of magnetic material having a central opening, for ultimate use as the magnetic structure in said meter, said magnetizing step occurring before said ring-shaped magnetic element is assembled into the meter, said magnetizing step comprising positioning said ring-shaped magnetic element in a magnetizer device adjacent a return path armature structure operative to effect a closed magnetic circuit of which said magnetic element forms a part, and then applying a magnetizing force to said magnetic element, while said magnetic element is so positioned adjacent said return path structure, which magnetizing force is in excess of that necessary to produce a desired final flux distribution about said magnetic element and of sufficiently large magnitude to turn substantially all magnetic domains in the material of said magnetic element in a desired direction, said magnetizing force being applied by said magnetizer device to said ring-shaped element in directions and at positions tending to form a pair of opposite polarity magnetic poles of arcuate shape diametrically opposed to one another on the flat surfaces of said element in at least partially surrounding relation to said central opening and having a relatively long air gap therebetween in the absence of said return path structure, said return path structure being operative to maintain the field strength of the poles thus formed so long as said magnetized element remains in said magnetizer device, removing said magnetized ring-shaped magnetic element from said magnetizer device without its associated return path structure and without any other "keeper" structure whereby, upon its said removal from said magnetizer device, said magnetized ring-shaped element partially demagnetizes due to the absence of a keeper structure thereby to effect a stable flux distribution curve of preselected shape and reduced amplitude about said magnetized ring-shaped element, and thereafter mounting said partially demagnetized ring-shaped magnetic element in said meter with the flat surfaces of said element being positioned in proximity and substantially parallel to a substantially flat rotor thereby to form a meter movement, said removal step comprising the sole demagnetization step to which said ring-shaped magnetic element is subjected prior to the mounting of said element in said meter.

2. The method of claim 1 wherein said magnetic element comprises a ceramic magnetic material, said magnetizing force having a magnitude of at least 20,000 oersteds.

3. The method of claim 1 in which said magnetic element comprises Alnico, said magnetizing force having a magnitude of at least 20,000 oersteds.

References Cited by the Examiner
UNITED STATES PATENTS
558,045    4/96    Cox _____ 29—155.59

WHITMORE A. WILTZ, *Primary Examiner.*